US012017335B2

(12) United States Patent
Mashiko et al.

(10) Patent No.: US 12,017,335 B2
(45) Date of Patent: Jun. 25, 2024

(54) DRIVER

(71) Applicant: KOKI HOLDINGS CO., LTD., Tokyo (JP)

(72) Inventors: Hironori Mashiko, Ibaraki (JP); Takashi Ueda, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 18/182,037

(22) Filed: Mar. 10, 2023

(65) Prior Publication Data

US 2023/0226675 A1 Jul. 20, 2023

Related U.S. Application Data

(63) Continuation of application No. 16/615,628, filed as application No. PCT/JP2018/017228 on Apr. 27, 2018, now Pat. No. 11,602,829.

(30) Foreign Application Priority Data

May 31, 2017 (JP) ................................. 2017-108454

(51) Int. Cl.
*B25C 1/04* (2006.01)
*B25C 1/00* (2006.01)
(Continued)

(52) U.S. Cl.
CPC ................ *B25C 1/047* (2013.01); *B25C 1/06* (2013.01); *B25C 1/008* (2013.01); *B25C 1/043* (2013.01); *B25C 1/08* (2013.01); *B25C 7/00* (2013.01)

(58) Field of Classification Search
CPC ........... B25C 1/04; B25C 1/047; B25C 1/041; B25C 1/06; B25C 1/08; B25C 1/008
(Continued)

(56) References Cited

U.S. PATENT DOCUMENTS 6,955,281 B1 * 10/2005 Wei ....................... B25C 5/1689 227/8
2005/0000998 A1 * 1/2005 Grazioli .................... B25C 1/10 227/10
(Continued)

FOREIGN PATENT DOCUMENTS

JP 54-074384 U 5/1979
JP 2008-068358 A 3/2008
(Continued)

OTHER PUBLICATIONS

Notice of Allowance dated Nov. 9, 2022 in U.S. Appl. No. 16/615,628 (8 pages).
(Continued)

*Primary Examiner* — Veronica Martin
(74) *Attorney, Agent, or Firm* — Rimon P.C.

(57) ABSTRACT

A driver capable of suppressing an increase in a load of a bumper is provided. The driver includes a striking portion provided movably and configured to move to strike a fastener; a bumper configured to be in contact with the striking portion to restrict a range of movement of the striking portion; and a housing configured to support the bumper, the driver further including a load suppressing portion configured to suppress an increase in a load of the bumper based on the load of the bumper detected by a load detection portion or number of operations of the striking portion within a predetermined time.

20 Claims, 7 Drawing Sheets

(51) Int. Cl.
*B25C 1/06* (2006.01)
*B25C 1/08* (2006.01)
*B25C 7/00* (2006.01)

(58) Field of Classification Search
USPC .................................................. 227/130, 131
See application file for complete search history.

(56) References Cited

U.S. PATENT DOCUMENTS

| | | | |
|---|---|---|---|
| 2008/0017689 A1 | 1/2008 | Simonelli et al. | |
| 2010/0237126 A1 | 9/2010 | Matsunaga et al. | |
| 2010/0243699 A1* | 9/2010 | Largo | B25C 1/08 227/10 |
| 2011/0303428 A1 | 12/2011 | Roth et al. | |
| 2012/0169256 A1* | 7/2012 | Suda | B25D 16/003 318/17 |
| 2014/0103840 A1 | 4/2014 | Lim | |
| 2017/0001291 A1 | 1/2017 | Schnell et al. | |
| 2018/0036870 A1* | 2/2018 | Komazaki | B25C 1/06 |

FOREIGN PATENT DOCUMENTS

| | | |
|---|---|---|
| JP | 2009-208178 A | 9/2009 |
| JP | 2012-000751 A | 1/2012 |
| JP | 2016-221610 A | 12/2016 |

OTHER PUBLICATIONS

Office Action dated Sep. 14, 2021 in U.S. Appl. No. 16/615,628 (9 pages).
Office Action dated Jun. 20, 2022 in U.S. Appl. No. 16/615,628 (10 pages).
International Search Report issued in corresponding International Patent Application No. PCT/JP2018/017228, dated Jul. 3, 2018, with English translation.
Notice of Allowance dated Nov. 9, 2022 in U.S. Appl. No. 16/615,628.
Extended European Search Report issued in corresponding European Patent Application No. 18810614.0-1017, dated Jan. 27, 2021.

* cited by examiner

10 : DRIVER
11 : HOUSING
12 : STRIKING PORTION
33 : BUMPER

DRIVER

CROSS REFERENCE TO RELATED APPLICATIONS

This application is a Continuation of U.S. patent application Ser. No. 16/615,628, filed on Nov. 21, 2019, which is a U.S. National Phase under 35 U.S.C. § 371 of International Patent Application No. PCT/JP2018/017228, filed on Apr. 27, 2018, which claims the benefits of Japanese Patent Application No. 2017-108454, filed on May 31, 2017 the entire contents of which are hereby incorporated by reference.

TECHNICAL FIELD

The present invention relates to a driver in which a striking portion is moved to strike a fastener.

BACKGROUND ART

Conventionally, a driver in which a striking portion is moved to strike a fastener has been known, and the driver is described in Patent Document 1. The driver described in Patent Document 1 includes a housing, a tail cover, a cylinder, a striking portion, a pressure chamber, a bumper, a magazine, an electric motor, a storage battery, and a power mechanism. The cylinder is provided in the housing, and the striking portion is movably supported by the cylinder. The pressure chamber is provided in the housing, and air is sealed in the pressure chamber. The tail cover and the cylinder are fixed to the housing.

The bumper is disposed between the cylinder and the tail cover. The bumper has a guide hole. The tail cover has an injection port. The electric motor is provided in the housing, and the power of the storage battery is supplied to the electric motor. The striking portion has a piston and a driver blade attached to the piston. The driver blade is movable in the guide hole and the injection port. The driver blade has a rack. The power mechanism has a circular plate and a pinion provided on the circular plate. The magazine contains fasteners and the magazine is attached to the tail cover. The fastener is supplied from the magazine to an injection path.

When the circular plate is rotated by a rotational force of the electric motor and the pinion is engaged with the rack, the striking portion is separated from the bumper and rises. When the striking portion reaches a top dead center, the pinion is released from the rack, and the striking portion falls by the pressure of the pressure chamber. When the striking portion falls, the driver blade strikes the fastener. After the driver blade strikes the fastener, the piston collides with the bumper, the bumper absorbs kinetic energy of the striking portion, and a part of the kinetic energy is converted into heat inside the bumper. Also, the bumper has a role of a stopper that restricts a moving range of the striking portion.

RELATED ART DOCUMENTS

Patent Documents

Patent Document 1: Japanese Patent Application Laid-Open Publication No. 2016-221610

SUMMARY OF THE INVENTION

Problem to be Solved by the Invention

The bumper used in the driver is generally formed of a flexible material such as rubber or elastomer, and the sustainability of the flexibility and the temperature are closely related to each other in the flexible material. Therefore, it is desirable to use the bumper within a predetermined temperature range. Further, if the bumper is continuously used in a high load state above the predetermined temperature range, there is a possibility that the life of the bumper is shortened. As described above, the heat converted from the kinetic energy by the striking operation is generated in the bumper. Meanwhile, the heat of the bumper is dissipated to outside through the housing. Also, the heat dissipation and cooling of the bumper are performed by the air inflow and outflow between the space below the piston in the cylinder and the outside of the housing caused by the rise and fall of the driver blade.

However, in the driver described in Patent Document 1, when the striking portion continuously repeats the striking operation or when the ambient temperature of the bumper is high, there is a possibility that the heat dissipation cannot catch up, the heat is accumulated in the bumper, and the bumper is used in the high load state.

In addition, the high load state of the bumper is caused also by the use in the state where the driving energy is excessively large regardless of the temperature of the bumper.

An object of the present invention is to provide a driver capable of suppressing the excessive load of the bumper and using the bumper within a predetermined load range, thereby giving a longer life to the bumper and the driver.

Means for Solving the Problems

The driver according to an embodiment includes a striking portion provided movably and configured to move to strike a fastener; a bumper configured to be in contact with the striking portion to restrict a range of movement of the striking portion; and a housing configured to support the bumper, the driver further including a load suppressing portion configured to suppress an increase in a load of the bumper based on the load of the bumper detected by a load detection portion or number of operations of the striking portion within a predetermined time.

Effects of the Invention

A driver according to an embodiment can suppress the increase in the load of the bumper.

DETAILED DESCRIPTION OF PREFERRED EMBODIMENTS

A driver according to an embodiment of the present invention will be described with reference to the drawings.

Figure 1:
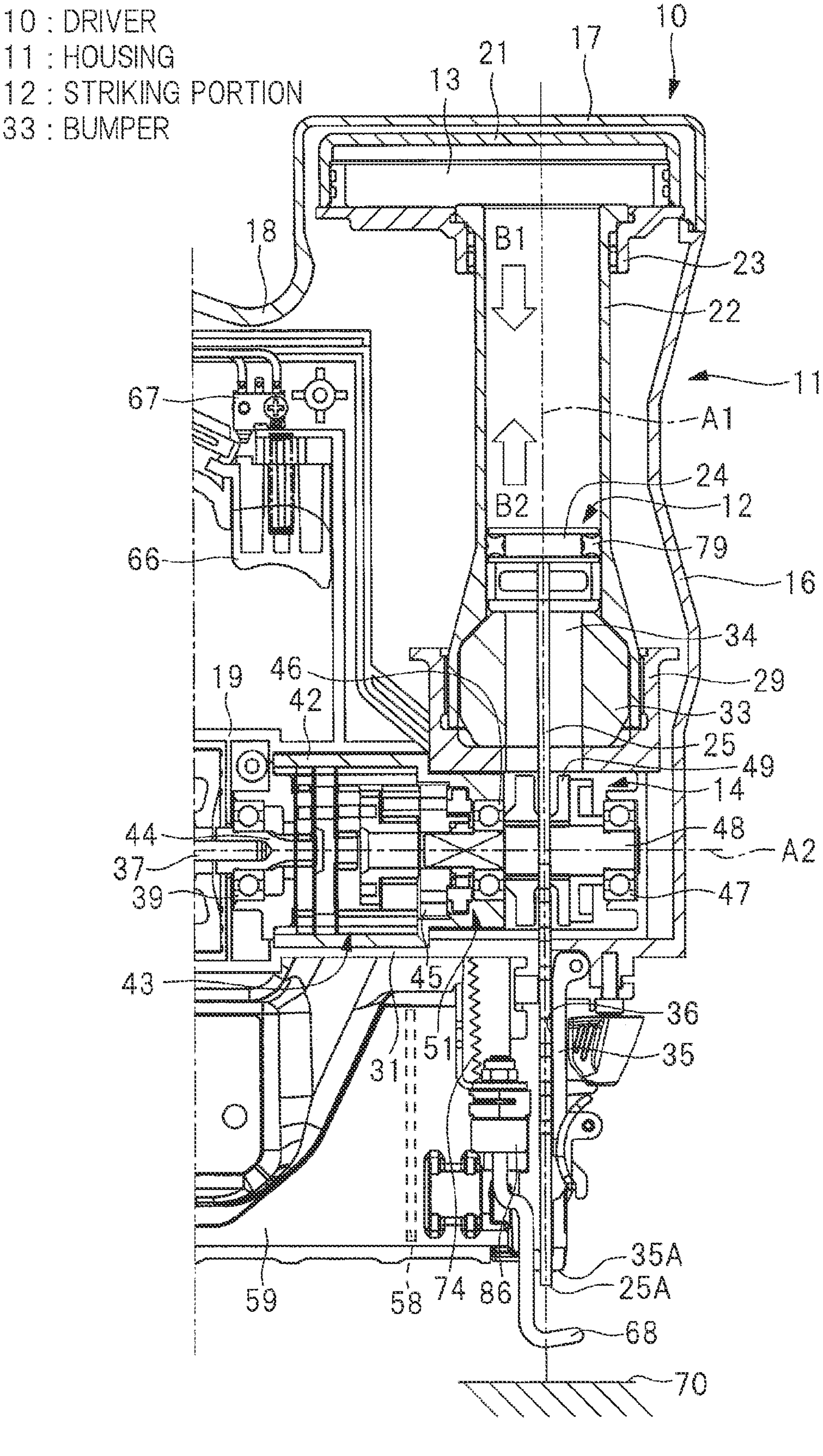
FIG. 1 is a side cross-sectional view showing a principal part of a driver according to an embodiment of the present invention.
Figure 2:
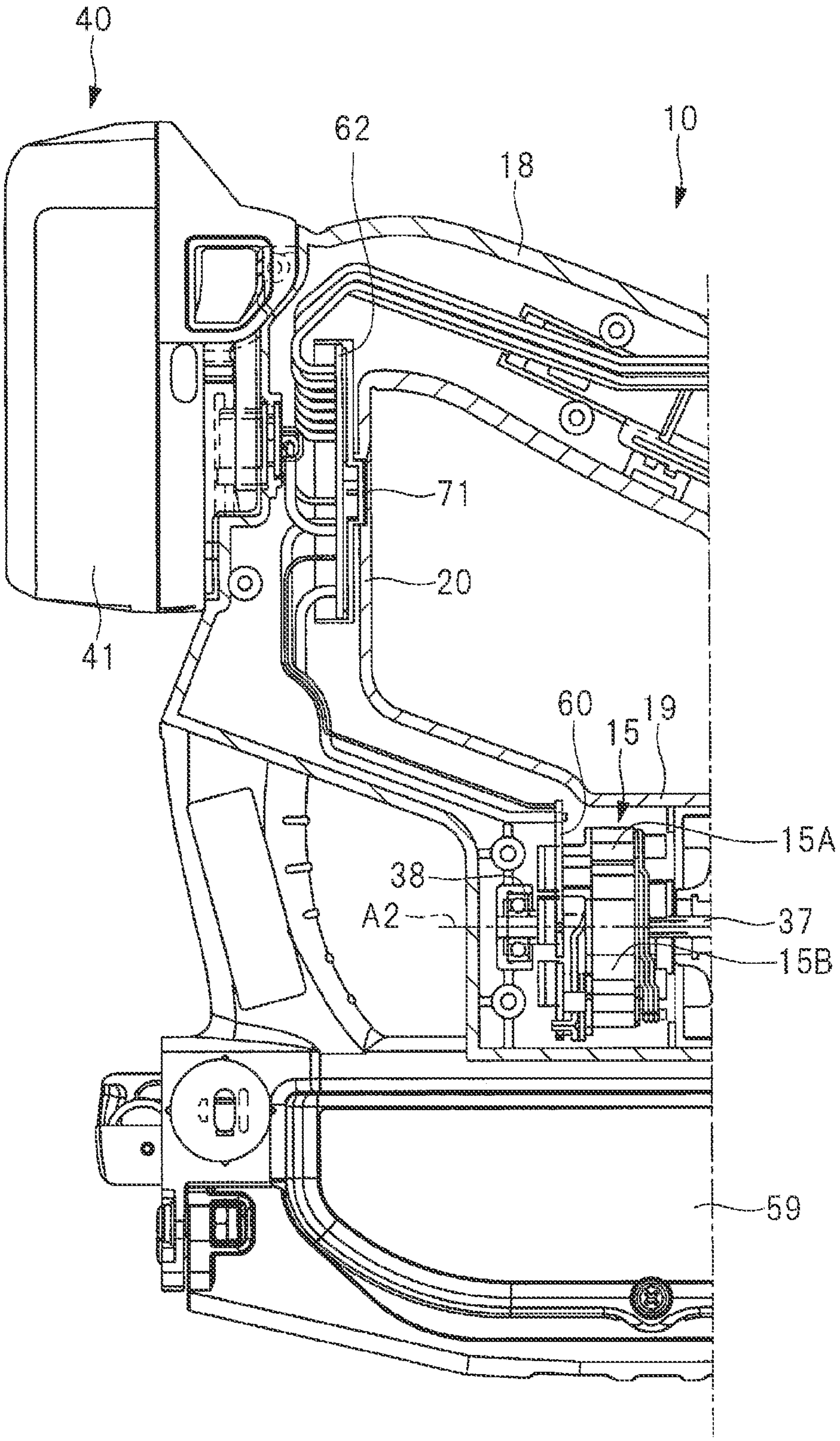
FIG. 2 is a side cross-sectional view showing the other part of the driver.
Figure 3:
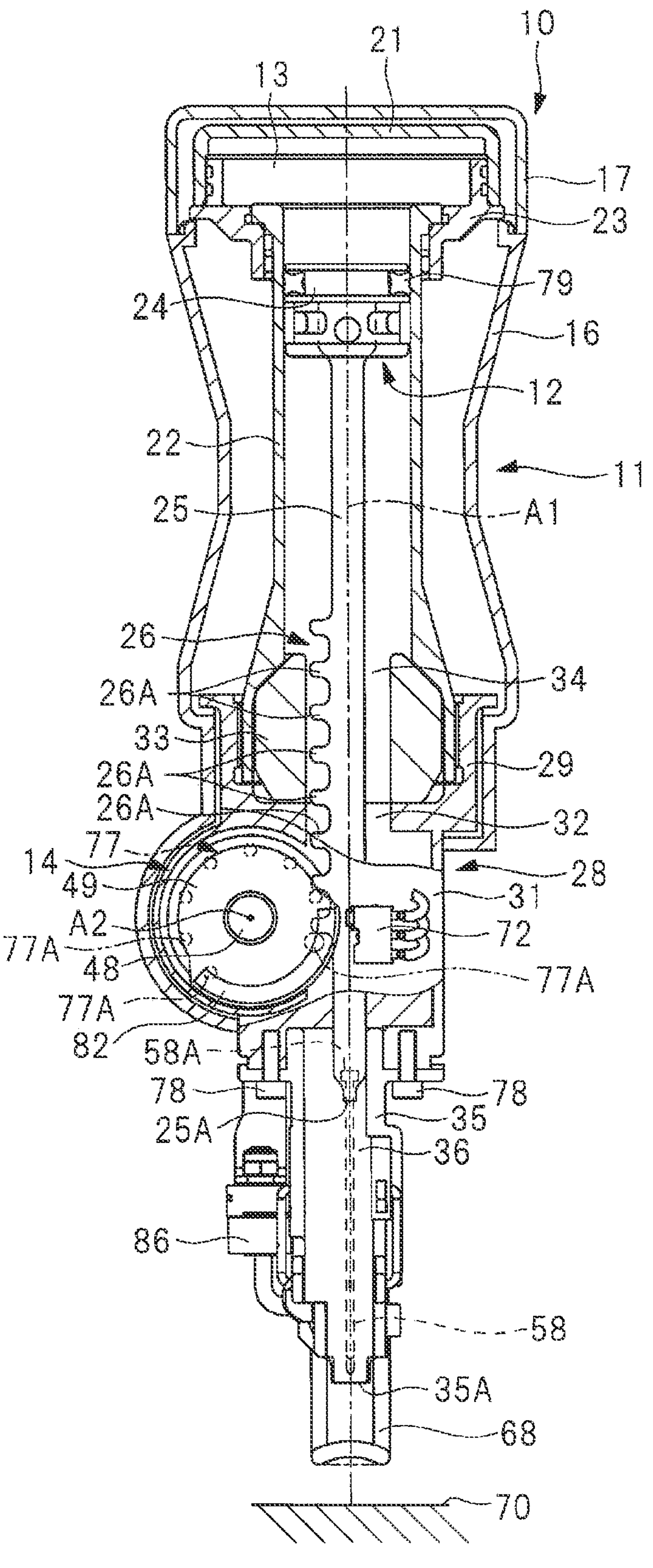
FIG. 3 is a front cross-sectional view of the driver shown in FIG. 1.

A driver 10 shown in FIG. 1, FIG. 2, and FIG. 3 includes a housing 11, a striking portion 12, a pressure chamber 13, a power transmission mechanism 14, and an electric motor 15. The housing 11 is an outer shell element, and the striking portion 12 is disposed from the inside to the outside of the housing 11. The striking portion 12 is movable in a first direction B1 and a second direction B2 in the housing 11. The pressure chamber 13 is provided in the housing 11, and the pressure chamber 13 moves the striking portion 12 in the first direction B1. The electric motor 15 is provided in the housing 11. The power transmission mechanism 14 is provided in the housing 11, and the power transmission mechanism 14 transmits a rotational force of the electric motor 15 to the striking portion 12, thereby moving the striking portion 12 in the second direction B2. The second direction B2 is a direction opposite to the first direction B1.

The housing 11 includes a cylindrical main body 16, a cover 17 to close an opening of the main body 16, a handle 18 and a motor storage portion 19 continuous to the main body 16, and a connecting portion 20 that connects the handle 18 and the motor storage portion 19. A pressure accumulation container 21 and a cylinder 22 are provided in the housing 11, and an annular connector 23 connects the pressure accumulation container 21 and the cylinder 22. The pressure chamber 13 is formed in the pressure accumulation container 21.

The striking portion 12 includes a piston 24 movably disposed in the cylinder 22 and a driver blade 25 fixed to the piston 24. The piston 24 is movable in a direction of a center line A1 of the cylinder 22. The direction of the center line A1 is parallel to the first direction B1 and the second direction B2. A sealing member 79 is attached to an outer circumference of the piston 24, and the sealing member 79 is in contact with an inner surface of the cylinder 22 to form a sealing surface. The sealing member 79 air-tightly seals the pressure chamber 13.

A member made of an organic material can be used as the sealing member 79, and examples of the organic material include synthetic rubber and synthetic resin. Examples of the synthetic rubber include nitrile rubber, acrylic rubber, silicon rubber, and fluorine rubber. Examples of the synthetic resin include tetrafluoroethylene resin. Examples of the sealing member 79 include a lip packing in addition to an O-ring. The lip packing may be any of an X type, an L type, and a U type. A compressed gas is held in the pressure chamber 13. Examples of the gas held in the pressure chamber 13 include inert gas such as nitrogen gas, noble gas or others in addition to air. In this embodiment, an example in which air is held in the pressure chamber 13 will be described.

The driver blade 25 is made of metal or resin. As shown in FIG. 3, a rack 26 is provided along a longitudinal direction of the driver blade 25. The rack 26 has a plurality of convex portions 26A. The plurality of convex portions 26 are arranged at constant intervals in the direction of the center line A1.

As shown in FIG. 3, a holder 28 is disposed from the inside to the outside of the main body 16. The holder 28 is made of aluminum alloy, magnesium alloy, or synthetic resin. The holder 28 includes a cylindrical load receiving portion 29 and a tail portion 31 continuous to the load receiving portion 29. The tail portion 31 is continuous to the motor storage portion 19.

The load receiving portion 29 is disposed in the main body 16, and the load receiving portion 29 has a shaft hole 32. A bumper 33 is provided in the load receiving portion 29. The bumper 33 is integrally formed of synthetic rubber or synthetic resin. The synthetic rubber includes soft rubber, and the synthetic resin includes urethane resin. The bumper 33 has a shaft hole 34. The shaft holes 32 and 34 are both arranged around the center line A1, and the driver blade 25 is movable in the direction of the center line A1 in the shaft holes 32 and 34. A nose portion 35 is fixed to the tail portion 31 by a screw member 78, and the nose portion 35 has an injection path 36. The injection path 36 is a space or a passage, and the driver blade 25 is movable in the direction of the center line A1 in the injection path 36.

The electric motor 15 is provided in the motor storage portion 19. The electric motor 15 includes a stator 15A that is not rotated with respect to the motor storage portion 19, a rotor 15B that is rotatable in the motor storage portion 19, and a motor shaft 37 to which the rotor 15B is attached. The stator 15A has an energizing coil, and the rotor 15B has a permanent magnet. The energizing coil includes three coils corresponding to three phases such as U phase, V phase, and W phase. The electric motor 15 is a brushless motor. The rotating magnetic field is formed by energizing the coil, so that the rotor 15B is rotated.

The motor shaft 37 is rotatably supported by bearings 38 and 39. The motor shaft 37 is rotatable around an axis line A2. As shown in FIG. 2, a storage battery 40 detachably attached to the connecting portion 20 is provided, and the storage battery 40 supplies power to the stator 15A of the electric motor 15.

The storage battery 40 includes a container case 41 and a battery cell contained in the container case 41. The battery cell is a secondary battery that can be charged and discharged, and any of a lithium ion battery, a nickel hydride battery, a lithium ion polymer battery, and a nickel cadmium battery can be used as the battery cell. The storage battery 40 is a DC power source. A first terminal is provided in the container case 41, and the first terminal is connected to the battery cell. When a second terminal is fixed to the connecting portion 20 and the storage battery 40 is attached to the connecting portion 20, the first terminal and the second terminal are connected so as to allow a current to flow therebetween.

As shown in FIG. 1, a gear case 42 is provided in the tail portion 31, and a speed reducer 43 is provided in the gear case 42. The speed reducer 43 includes an input member 44, an output member 45, and three pairs of planetary gear mechanisms. The input member 44 is fixed to the motor shaft 37. The input member 44 and the output member 45 are rotatable around the axis line A2. A rotational force of the motor shaft 37 is transmitted to the output member 45 through the input member 44. The speed reducer 43 reduces a rotation speed of the output member 45 with respect to the input member 44.

The power transmission mechanism 14 is provided in the main body 16. The power transmission mechanism 14 includes a pin wheel shaft 48, a pin wheel 49 fixed to the pin wheel shaft 48, and a pinion 77 provided to the pin wheel 49. The pin wheel shaft 48 is rotatably supported by bearings 46 and 47. The pinion 77 has a plurality of pins 77A arranged at intervals in a circumferential direction of the pin wheel 49. The number of convex portions 26A constituting the rack 26 is the same as the number of pins 77A constituting the pinion 77. The power transmission mechanism 14 converts the rotational force of the pin wheel 49 into the moving force of the striking portion 12.

A rotation control mechanism 51 is provided in the gear case 42. The rotation control mechanism 51 is disposed in the power transmission path between the speed reducer 43 and the pin wheel 49. The rotation control mechanism 51 allows the pin wheel shaft 48 to rotate anticlockwise in FIG. 3 by the rotational force of the output member 45. Also, the rotation control mechanism 51 prevents the pin wheel shaft 48 from rotating clockwise in FIG. 3 by the force transmitted from the driver blade 25.

In addition, a magazine 59 containing nails 58 is provided, and the magazine 59 is supported by the nose portion 35 and the connecting portion 20. The magazine 59 includes a feed mechanism that supplies the nail 58 to the injection path 36.

Figure 4:
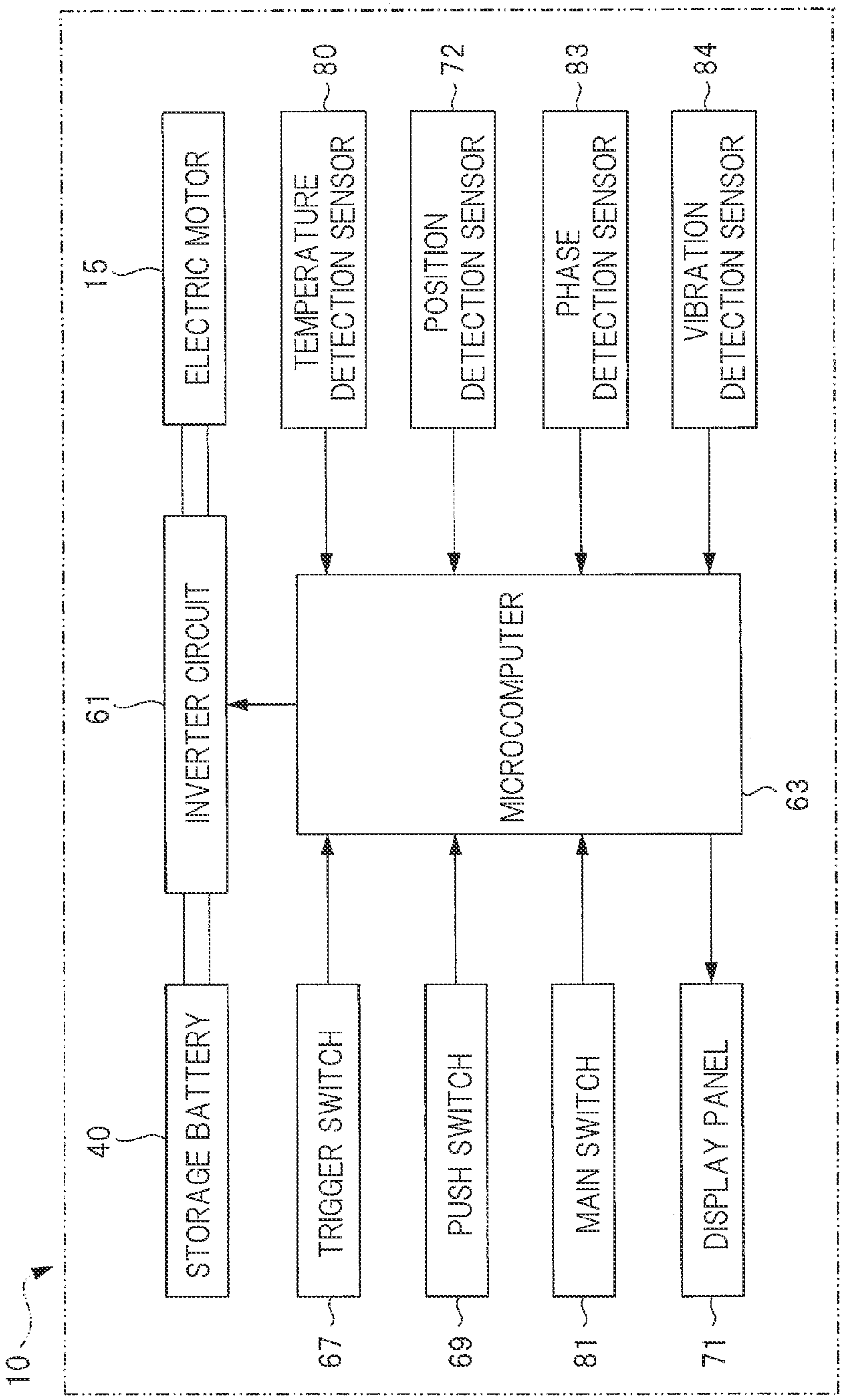
FIG. 4 is a block diagram showing a control system of the driver.

A motor board 60 is provided in the motor storage portion 19. An inverter circuit 61 shown in FIG. 4 is provided on the motor board 60. The inverter circuit 61 includes a plurality of switching elements and each of the plurality of switching elements can be individually switched on and off. A field effect transistor (FET) or an insulated gate bipolar transistor (IGBT) can be used as the switching element.

As shown in FIG. 2, a control board 62 is provided in the connecting portion 20, and a microcomputer 63 shown in FIG. 4 is provided on the control board 62. The microcomputer 63 includes an input port, an output port, a central processing unit, a memory device, and a timer. The microcomputer 63 is connected to the second terminal and the inverter circuit 61. A temperature detection sensor 80 shown in FIG. 4 is provided on the control board 62. A thermistor can be used as the temperature detection sensor 80.

A main switch 81 shown in FIG. 4 is provided in the housing 11. The main switch 81 is provided in the connecting portion 20 or the handle 18. A user operates the main switch 81. When a worker turns on the main switch 81 in the state where the storage battery 40 is attached to the connecting portion 20, the voltage of the storage battery 40 is applied to the microcomputer 63, and the microcomputer 63 boots up. When the user turns off the main switch 81, the microcomputer 63 stops.

As shown in FIG. 1, a trigger 66 is provided to the handle 18. A user operates the trigger 66. A trigger switch 67 is provided in the handle 18, and the trigger switch 67 is turned on when the user applies an operation force to the trigger 66 and the trigger switch 67 is turned off when the operation force applied to the trigger 66 is released.

A push lever 68 is attached to the nose portion 35. The push lever 68 is movable in the direction of the center line A1 with respect to the nose portion 35. As shown in FIG. 1, an elastic member 74 configured to bias the push lever 68 in the direction of the center line A1 is provided. The elastic member 74 is a compression coil spring made of metal, and the elastic member 74 biases the push lever 68 in the direction away from the bumper 33. A stopper 86 is provided to the nose portion 35, and the push lever 68 biased by the elastic member 74 is stopped while being in contact with the stopper 86.

A push switch 69 shown in FIG. 4 is provided to the nose portion 35. The push switch 69 is turned on when the push lever 68 is pressed to a workpiece 70. The push switch 69 is turned off when the push lever 68 is released from the workpiece 70.

A position detection sensor 72 that detects a rotation state of the pin wheel 49, that is, a rotation angle is provided. The position detection sensor 72 is provided to the tail portion 31. Also, a permanent magnet 82 is attached to the pin wheel 49. The position detection sensor 72 outputs a signal in accordance with the intensity of the magnetic field formed by the permanent magnet 82. The position detection sensor 72 is separated from the permanent magnet 82. The position detection sensor 72 is a non-contact magnetic sensor. The microcomputer 63 can estimate the position of the striking portion 12, the presence or absence of the striking operation performed by the striking portion 12, and the time interval of the striking operations performed by the striking portion 12 by processing the signal of the position detection sensor 72.

A phase detection sensor 83 shown in FIG. 4 is provided in the motor storage portion 19. The phase detection sensor 83 detects the position of the motor shaft 37 in the rotation direction, that is, the phase and outputs a signal. A permanent magnet is attached to the motor shaft 37. The phase detection sensor 83 is a magnetic sensor. The phase detection sensor 83 outputs a signal in accordance with the intensity of the magnetic field formed by the permanent magnet.

Further, a vibration detection sensor 84 shown in FIG. 4 is provided in the housing 11. The vibration detection sensor 84 detects the vibration of the housing 11 in the direction of the center line A1 and outputs a signal. An acceleration sensor or a speed sensor can be used as the vibration detection sensor 84. The vibration detection sensor 84 can be attached to an inner surface of the main body 16, an inner surface of the connecting portion 20, an inner surface of the motor storage portion 19, an inner surface of the handle 18, or the like.

As shown in FIG. 2, a display panel 71 is provided to the connecting portion 20. Examples of the display panel 71 include a liquid crystal panel visually recognizable by a user and an LED display. The display panel 71 displays the state of the driver 10, for example, the load of the bumper 33, the presence or absence of the control to suppress the increase in the load of the bumper 33, and the voltage of the storage battery 40. The state of a load member will be described later. The display panel 71 is exposed to outside of the connecting portion 20, and a user can visually recognize the display panel 71. Note that the main switch 81 may be provided on the display panel 71.

An example of using the driver 10 will be described. When a user attaches the storage battery 40 to the connecting portion 20 and the user turns on the main switch 81, the microcomputer 63 boots up. When the microcomputer 63 detects at least one of the trigger switch 67 being turned off and the push switch 69 being turned off, the microcomputer 63 turns off all of the switching elements of the inverter circuit 61. Namely, the power of the storage battery 40 is not supplied to the electric motor 15, and the electric motor 15 is stopped.

When the electric motor 15 is stopped, the pins 77A of the pinion 77 and the convex portions 26A of the rack 26 are engaged with each other, and the striking portion 12 is stopped at the standby position as shown in FIG. 3. When the striking portion 12 is stopped at the standby position, the piston 24 is separated from the bumper 33. The standby position of the striking portion 12 is present between the top dead center and the bottom dead center in the direction of the center line A1. The top dead center of the striking portion 12 is the position where the piston 24 is farthest from the bumper 33 in the direction of the center line A1 in FIG. 1 and FIG. 3. The bottom dead center of the striking portion 12 is the position where the piston 24 is pressed to the bumper 33 as shown in FIG. 1.

When the striking portion 12 is stopped at the standby position as shown in FIG. 3, a tip 25A of the driver blade 25 is located between a head 58A of the nail 58 and a tip 35A of the nose portion 35 in the direction of the center line A1. When the striking portion 12 is stopped at the standby position and the push lever 68 is separated from the workpiece 70, the push lever 68 is stopped while being in contact with the stopper 86.

The microcomputer 63 detects that the striking portion 12 is stopped at the standby position based on the signal output from the position detection sensor 72, and the microcomputer 63 stops the electric motor 15. When the electric motor 15 is stopped, the rotation control mechanism 51 holds the striking portion 12 at the standby position.

The striking portion 12 receives the biasing force in accordance with the air pressure of the pressure chamber 13, and the biasing force received by the striking portion 12 is transmitted to the pin wheel shaft 48 thorough the pin wheel 49. When the pin wheel shaft 48 receives the rotational force in the clockwise direction in FIG. 3, the rotation control mechanism 51 receives the rotational force and prevents the rotation of the pin wheel shaft 48. The pin wheel 49 is stopped in this manner, and the striking portion 12 is stopped at the standby position in FIG. 3.

When the trigger switch 67 is turned on and the push switch 69 is turned on, the microcontroller 63 repeats the control to turn on and off the switching elements of the inverter circuit 61, thereby supplying the power of the storage battery 40 to the electric motor 15. Then, the motor shaft 37 of the electric motor 15 is rotated. The rotational force of the motor shaft 37 is transmitted to the pin wheel shaft 48 through the speed reducer 43.

The rotation directions of the motor shaft 37 and the output member 45 are the same, and when the output member 45 is rotated, the rotational force of the output member 45 is transmitted to the pin wheel 49 and the pin wheel 49 is rotated in the anticlockwise direction in FIG. 3. When the pin wheel 49 is rotated in the anticlockwise direction in FIG. 3, the rotational force of the pin wheel 49 is transmitted to the striking portion 12. Therefore, the striking portion 12 moves so as to approach to the pressure accumulation container 21 in the direction of the center line A1. Namely, the striking portion 12 rises against the air pressure of the pressure chamber 13. When the striking portion 12 rises, the air pressure of the pressure chamber 13 increases.

When the striking portion 12 reaches the top dead center, the tip 25A of the driver blade 25 is located at the position higher than the head 58A of the nail 58. Also, when the striking portion 12 reaches the top dead center, the pins 77A of the pinion 77 are released from the convex portions 26A of the rack 26. Therefore, the striking portion 12 falls toward the bottom dead center by the air pressure of the pressure chamber 13. The driver blade 25 strikes the head 58A of the nail 58 in the injection path 36, and the nail 58 is driven into the workpiece 70.

Also, when the whole of the nail 58 bites into the workpiece 70 and the nail 58 is stopped, the tip 25A of the driver blade 25 is separated from the head 58A of the nail 58 by the reaction force. Further, the piston 24 collides with the bumper 33, and the kinetic energy of the striking portion 12 is absorbed by the elastic deformation of the bumper 33.

In addition, the motor shaft 37 of the electric motor 15 rotates also after the driver blade 25 strikes the nail 58. Then, when the pins 77A of the pinion 77 are engaged with the convex portions 26A of the rack 26, the piston 24 rises again by the rotational force of the pin wheel 49 in FIG. 1. The microcomputer 63 detects the position of the pin wheel 49 also after the nail 58 is driven. When the microcomputer 63 detects that the striking portion 12 reaches the standby position of FIG. 3, the microcomputer 63 stops the electric motor 15. Namely, the pin wheel 49 is stopped and the rotation control mechanism 51 holds the piston 24 at the standby position.

A user can switch a first striking operation and a second striking operation when using the driver 10. The first striking operation is referred to as a single fire mode, and the striking portion 12 sequentially strikes the plurality of nails 58 by alternately repeating the on and off of the push switch 69 and the on and off of the trigger switch 67 in the first striking operation. The second striking operation is referred to as a continuous fire mode, and the striking portion 12 continuously strikes the plurality of nails 58 by alternately repeating the on and off of the push switch 69 while the user maintains the on state of the trigger switch 67 in the second striking operation. A second time interval to strike the plurality of nails 58 in the second striking operation is shorter than a first time interval to strike the plurality of nails 58 in the first striking operation.

When the operation to strike the nail 58 by the striking portion 12 is repeated in the driver 10, the load of the bumper 33 increases, and there is a possibility that the function of the bumper 33 is degraded. For example, there is a possibility that the function of the bumper 33 is degraded due to the deformation, the stress concentration, and the deterioration of the bumper 33. The microcomputer 63 can execute the control example of FIG. 5 in order to suppress the increase in the load of the bumper 33.

First, when the microcomputer 63 detects that the main switch 81 is turned on in step S1, the microcomputer 63 performs an addition process based on an initial temperature of the control board 62 in step S2. The addition process performed by the microcomputer 63 in step S2 is the process in accordance with the temperature detected by the temperature detection sensor 80. For example, if the temperature at the time when the main switch 81 is turned on is 40° C. or lower, an initial addition point of the load is set to 0 point. Meanwhile, if the temperature at the time when the main switch 81 is turned on is higher than 40° C., the initial addition point of the load is set to 5000 point. In step S2, the process to add the initial addition point to the total value of the load point of the bumper 33 is performed.

Then, the microcomputer 63 performs a reset process of the total value of the load point stored in accordance with the time interval of the striking operations performed by the striking portion 12 in step S3. The microcomputer 63 starts to measure the time interval of the striking operations performed by the striking portion 12 in step S4, and starts to measure a deduction reference time in step S5. The deduction reference time is used when determining whether to execute the control to subtract a predetermined load point from the total value of the load point or not.

The microcomputer 63 determines whether the striking operation by the striking portion 12 is performed or not in step S6, and when determined Yes in step S6, the microcomputer 63 performs a process to add the load point in accordance with the time interval of the striking operations performed by the striking portion 12 to the total value of the load point in step S7. For example, the load point to be added becomes smaller as the time interval of the striking operations performed by the striking portion 12 becomes longer.

The microcomputer 63 determines whether the obtained total value of the load point becomes equal to or larger than a threshold value within a first predetermined time in step S8. The threshold value is the value for determining whether the control to suppress the increase in the load of the bumper 33 is executed or not, and the microcomputer 63 stores the threshold value in advance. The first predetermined time is an elapsed time from when the control of step S4 is started or an elapsed time from when a worker is considered as starting to use the driver such as the time from when the operation in the driver is started, the time from when an operation member such as the trigger 66 or the push lever 68 is operated, the time from when the electric motor 15 starts to operate for the striking operation, the time from when the initial striking operation after powering on the driver is performed, the time from when the microcomputer 63 issues an instruction of the striking operation, and the time from when a feeder of the magazine 59 moves. When determined Yes in step S8, the microcomputer 63 executes the control to suppress the increase in the load of the bumper 33 in step S9 and finishes the control of FIG. 5.

The control executed by the microcomputer 63 in step S9 includes either a first control or a second control. The first control is to stop the electric motor 15 even when the trigger switch 67 is turned on and the push switch 69 is turned on. The second control is to permit the first striking operation and to prohibit the second striking operation. Also, the microcomputer 63 displays that the control to suppress the increase in the load of the bumper 33 is executed on the display panel 71 in step S9. Note that, when the temperature detected by the temperature detection sensor 80 is lowered, the microcomputer 63 cancels the first control or the second control. Further, when determined No in step S8, the microcomputer 63 proceeds to step S3.

When determined No in step S6, the microcomputer 63 proceeds to step S10 and determines whether the deduction reference time being measured becomes equal to or longer than a second predetermined time. The second predetermined time is a threshold value of an elapsed time after starting the detection of the deduction reference time in step S5. When determined Yes in step S10, the microcomputer 63 performs a process to subtract a predetermined load point in accordance with the measured deduction reference time from the total point of the load in step S11 and proceeds to step S4.

The microcomputer 63 increases the load point to be subtracted as the measured deduction reference time becomes longer in step S11. Also, the microcomputer 63 performs a process to reset the deduction reference time being measured in step S11. Note that, when determined No in step S10, the microcomputer 63 proceeds to step S4.

Figure 6:
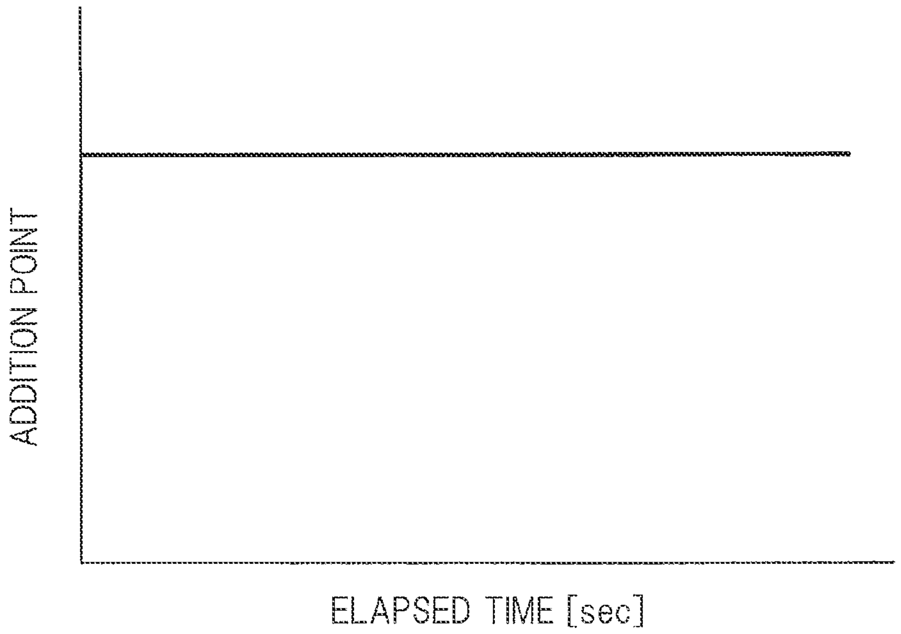
FIG. 6 is a diagram showing an example of a map used when adding the load of the bumper in the control example of FIG. 5.
Figure 7:
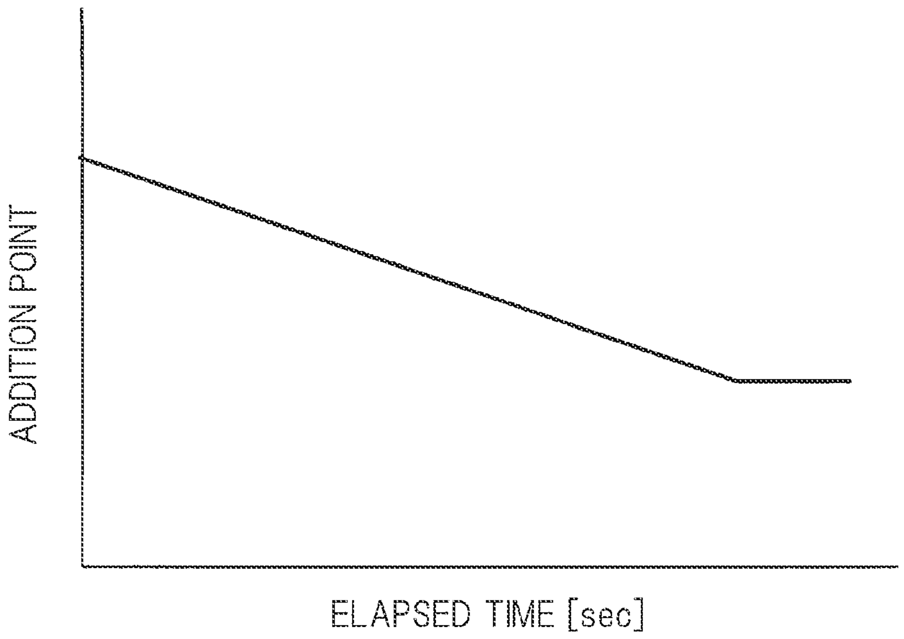
FIG. 7 is a diagram showing another example of the map used when adding the load of the bumper in the control example of FIG. 5.

Examples of a map that can be used when the microcomputer 63 executes the control of step S7 will be described with reference to FIG. 6 and FIG. 7. The map of FIG. 6 shows an example in which the load point added to the total value of the load point is constant regardless of the elapsed time between the striking operations. The map of FIG. 7 shows an example in which the load point added to the total value of the load point decreases as the elapsed time becomes longer.

Figure 8:
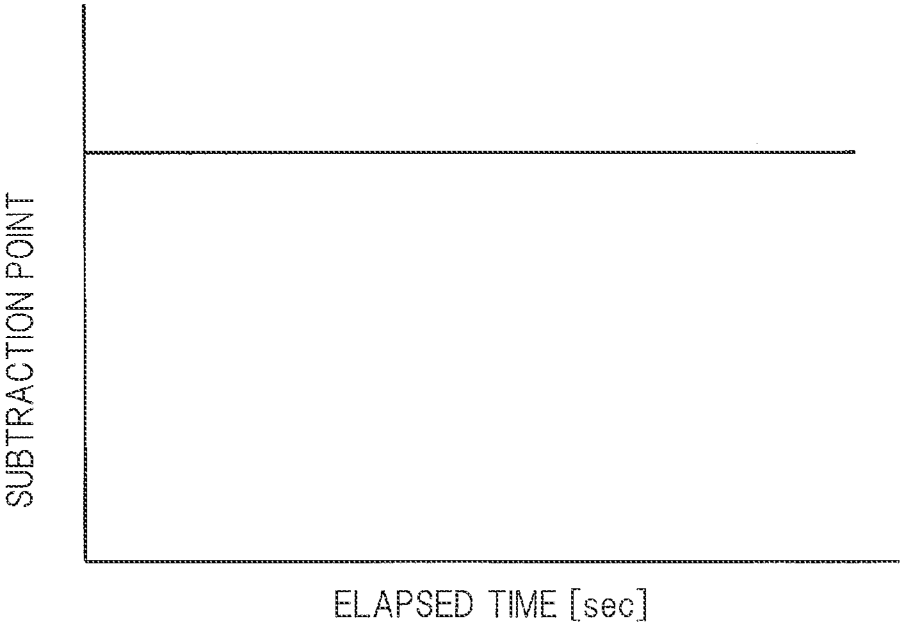
FIG. 8 is a diagram showing an example of a map used when subtracting the load of the bumper in the control example of FIG. 5.
Figure 9:
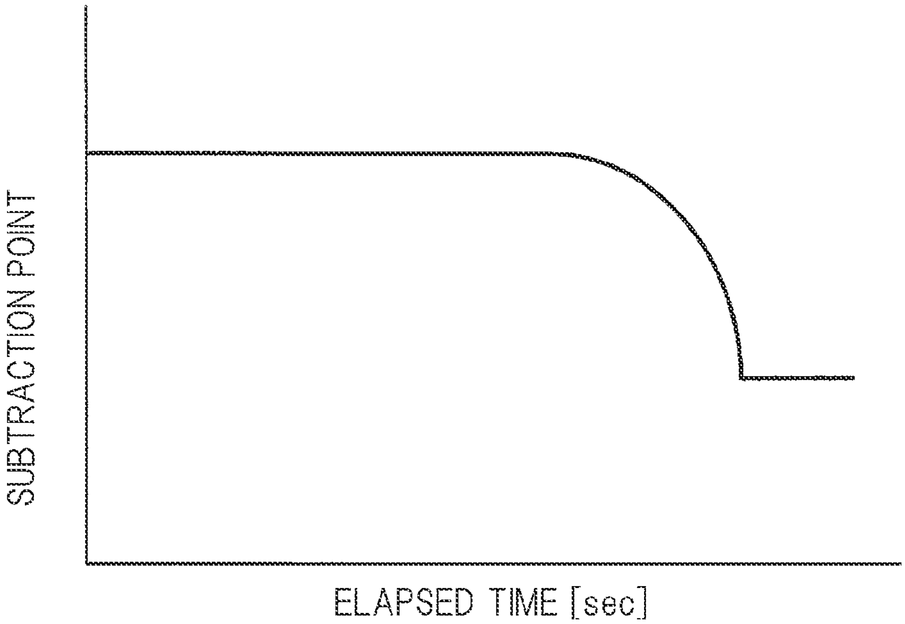
FIG. 9 is a diagram showing another example of the map used when subtracting the load of the bumper in the control example of FIG. 5.

Examples of a map that can be used when the microcomputer 63 executes the control of step S11 will be described with reference to FIG. 8 and FIG. 9. The elapsed time shown in FIG. 8 and FIG. 9 corresponds to the deduction reference time whose measurement is started in step S5. The map of FIG. 8 shows an example in which the load point subtracted from the total value of the load point is constant regardless of the elapsed time. The map of FIG. 9 shows an example in which the load point subtracted from the total value of the load point decreases as the elapsed time becomes longer.

As described above, the microcomputer 63 estimates the load of the bumper 33 based on the time interval of the striking operations performed by the striking portion 12, and suppresses the increase in the load of the bumper 33 by suppressing the number of striking operations performed by the striking portion 12 when the total value of the load of the bumper 33 is equal to or larger than the threshold value. In addition, when the total value of the load of the bumper 33 is smaller than the threshold value, the microcomputer 63 allows the increase in the number of striking operations of the striking portion 12. Therefore, it is possible to suppress the degradation of the buffering function of the bumper 33 due to the increase in the load of the bumper 33.

Also, the temperature of the control board 62 detected by the temperature detection sensor 80 is added as a part of the condition to estimate the load of the bumper 33. Therefore, it is possible to estimate the load of the bumper 33 even in the situation that the temperature of the bumper 33 is less likely to be lowered as in the case where the storage battery 40 whose charge amount is reduced is detached from the connecting portion 20 after the driver 10 is used in the previous operation and then the storage battery 40 with sufficient charge amount is attached to the connecting portion 20 to perform the next striking operation by the driver 10.

Further, when the second predetermined time or more passes without performing the striking operation by the striking portion 12, it is possible to estimate the load of the bumper 33 on the assumption that the temperature of the bumper 33 has been lowered. Therefore, it is possible to estimate the load of the bumper 33 in accordance with the temperature condition.

Further, as a modification of the present embodiment, the driver 10 may execute the control to suppress the increase in the load of the bumper 33 based on the number of striking operations performed by the striking portion 12 within a predetermined time considered as the load of the bumper instead of the estimated load. Namely, when the worker starts to use the driver 10 or when the driver 10 is used successively, the number of striking operations of the driver within the predetermined time is stored, and it is determined whether the number of striking operations is so large to cause the increase in the load of the bumper 33 and the temperature rise. This is determined by whether the number of operations (number of driven nails) within the predetermined time exceeds the predetermined number of times. Then, when the number of striking operations exceeds the specified value, the increase in the load of the bumper 33 is suppressed by suppressing the number of striking operations performed by the driver, that is, by controlling the time from one striking operation to the next striking operation to be made longer so as to limit the driving operation until the next driving operation becomes possible. The limitation of the driving operation may be made by restricting the first striking operation as in the embodiment described above.

Also, when the striking operation by the striking portion 12 is not performed for a predetermined time after the striking operation is suppressed or when the number of operations within the predetermined time is smaller than the number determined as the condition to cancel the suppression in advance, the control to suppress the operation is cancelled.

The meanings of the matters described in the embodiment will be described. The nail 58 is an example of a fastener, and the display panel 71 is an example of an output unit. The microcomputer 63, the position detection sensor 72, and the temperature detection sensor 80 are examples of a load detection portion. The microcomputer 63, the inverter circuit 61, and the electric motor 15 are examples of a load suppressing portion. The electric motor 15 is an example of a motor. The motor board 60, the control board 62, and the microcomputer 63 are examples of a control unit. "The predetermined load point" subtracted in step S11 is an example of "a predetermined value".

Figure 5:
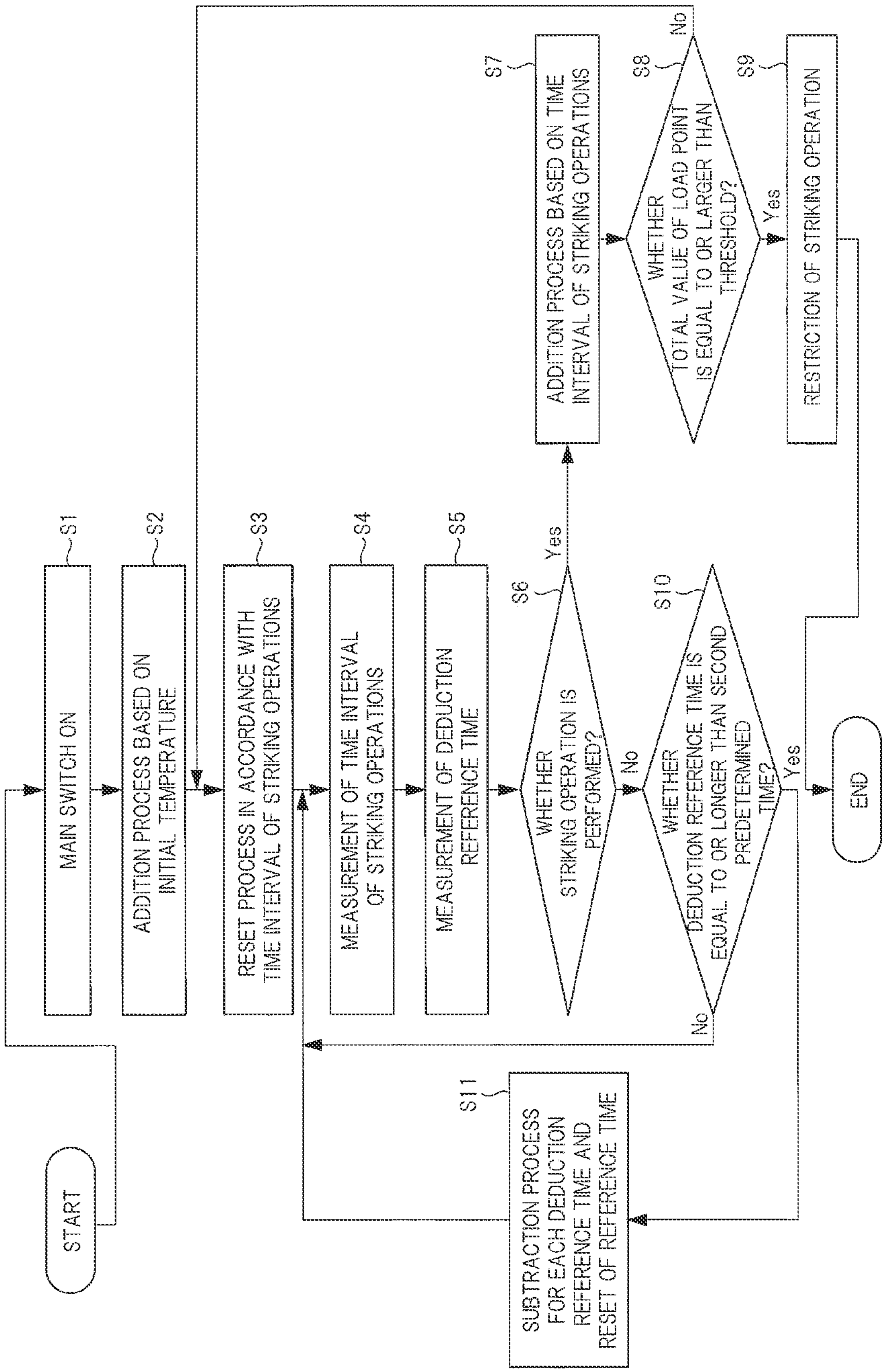
FIG. 5 is a flowchart showing a control example for suppressing the increase in the load of the bumper provided in the driver.

The driver is not limited to that described in the embodiment above, and can be modified in various ways within the scope of the embodiment. For example, the temperature used in the addition process in step S2 of the control example of FIG. 5 is not limited to 40° C. It is also possible to increase the initial addition point as the temperature becomes higher. The temperature detection sensor 80 may be provided to the motor board 60 or the load receiving portion 29 in addition to the control board 62.

When executing the control example of FIG. 5, the microcomputer 63 can estimate the presence or absence of the striking operation performed by the striking portion 12 based on the time interval from when the microcomputer 63 detects that the push switch 69 and the trigger switch 67 are turned on and the power of the storage battery 40 is supplied to the electric motor 15 to perform the striking operation to when the microcomputer 63 detects that the push switch 69 and the trigger switch 67 are turned on again. Namely, it is also possible to estimate the time interval of the striking operations performed by the striking portion 12 and the presence or absence of the striking operation performed by the striking portion 12 based on the interval of the operations of the various switches for operating the electric motor 15.

Also, the microcomputer 63 can estimate the time interval of the striking operations performed by the striking portion 12 and the presence or absence of the striking operation performed by the striking portion 12 based on the energizing time and the current value to the electric motor 15 when executing the control example of FIG. 5. Namely, it is also possible to estimate the time interval of the striking operations performed by the striking portion 12 and the presence or absence of the striking operation performed by the striking portion 12 based on the interval of the energizing current for operating the electric motor 15.

Further, the microcomputer 63 can estimate the time interval of the striking operations performed by the striking portion 12 and the presence or absence of the striking operation performed by the striking portion 12 by processing the signal of the vibration detection sensor 84 when executing the control example of FIG. 5.

In addition, the driver may be provided with a load detection sensor for detecting the load received by the bumper. This driver can estimate the time interval of the striking operations by the striking portion and the presence or absence of the striking operation by processing the signal of the load detection sensor when the microcomputer executes the control example of FIG. 5.

Furthermore, the driver may be provided with a fastener detection sensor for detecting the number of nails 58 supplied to the injection path 36. This driver can estimate the time interval of the striking operations by the striking portion and the presence or absence of the striking operation by processing the signal of the fastener detection sensor when the microcomputer executes the control example of FIG. 5.

Examples of the load of the bumper described in the embodiment include the amount of deformation of the bumper, the load received by the bumper, the stress of the bumper, the lifetime of the bumper, the impact absorbing function of the bumper, the degradation of the bumper, and the like. Examples of the load detection portion and the load suppressing portion include various sensors, processors, circuits, storage devices, modules, and units.

Examples of a first biasing mechanism configured to move the striking portion from the first position to the second position include a structure to apply the gas pressure to the striking portion and a structure to apply the elastic restoring force of the spring to the striking portion. Examples of the structure to apply the gas pressure to the striking portion include a structure in which combustible gas is burned in a combustion chamber and the pressure of the combustion chamber is applied to the striking portion. Examples of the structure to apply the gas pressure to the striking portion include a structure in which gas is supplied from outside of the housing into the housing through a hose and the striking portion is moved by the pressure of the gas.

Examples of a motor of a second biasing mechanism configured to move the striking portion from the second position to the first position include a hydraulic motor and a pneumatic motor in addition to an electric motor. The electric motor may be either a brush motor or a blushless motor. The power source of the electric motor may be either a DC power source or an AC power source. Examples of the power source include a power source detachably attached to the housing and a power source connected to the housing through a power cable.

Examples of the second biasing mechanism configured to move the striking portion from the second position to the first position include a traction mechanism in addition to the rack and pinion mechanism. The traction mechanism includes a rotational element rotated by the rotational force of the motor and a cable wound around the rotational element and connected to the striking portion. The cable is wound around the rotational element by the rotational force of the motor, so that the striking portion moves from the second position to the first position.

Examples of the output unit include a bother and a speaker capable of audio output in addition to the display panel that is visually recognizable by a user. Namely, any output may be applied as the output performed by the output unit in the embodiment as long as the output can be recognized visually or audibly by the user.

When a weight that moves in the direction opposite to that of the striking portion is provided in the housing, it is possible to suppress the increase in the number of striking operations by detecting the load of the bumper that restricts the moving range of the weight.

Note that, in the description with reference to FIG. 3, the pin wheel 49 is described as being rotated in the anticlockwise direction. This is the definition made for convenience in order to describe the rotation direction of the pin wheel 49 in the state where the driver 10 is seen from the front in FIG. 3. Examples of the workpiece 70 include a floor, a wall, a ceiling, a post, and a roof. Examples of a material of the workpiece 70 include a wood, a concrete, and a plaster.

In the embodiment described above, the load that exerts thermal influence has been described as an example of the load of the bumper, but the load of the bumper provided in the driver is not limited to the thermal load. Any load can be applied as the load of the bumper as long as the impact of the striking operation exerts the influence on the durability of the bumper, that is, at least the bonding between atoms or molecules of the material constituting the bumper. Therefore, the driver according to the embodiment is not limited to the bumper formed of rubber or elastomer, and any bumper member that absorbs the impact is also applicable. Examples of the bumper of the driver include a spring formed of metal or composite material and a constituent member that contains gas such as an air spring or air cushion in addition to the bumper formed of rubber or elastomer described as an example.

For example, the driver according to the embodiment includes the restriction of the continuation of the striking operation by which the impact equal to or larger than a predetermined range is applied to the bumper. The impact equal to or larger than the predetermined range applied to the bumper has a value exceeding the light load received by the bumper in accordance with the striking force necessary when a short nail, a thin nail or the like as a fastener is driven. This is particularly effective in the driver whose driving force is adjustable, for example, the gas spring type driver having the structure in which the striking portion is moved by the pressure of the gas held in the housing, the driver having the structure in which the striking portion is moved by the compressed air supplied from a compressor through an air hose, the gas combustion type driver having the structure in which the striking portion is moved by the gas combustion energy, the driver having the structure in which the striking portion is moved by the inertial force of a high-speed rotating body such as a flywheel, and the like.

REFERENCE SIGNS LIST

10 . . . driver, 11 . . . housing, 15 . . . electric motor, 33 . . . bumper, 60 . . . motor board, 61 . . . inverter circuit, 62 . . . control board, 63 . . . microcomputer, 71 . . . display panel, 72 . . . position detection sensor, 80 . . . temperature detection sensor

The invention claimed is:

1. A driver comprising:

a striker operable to strike a fastener;

a control circuit configured to operate the striker; and a bumper configured to receive impact from the striker, wherein the control circuit is further configured to impose a restriction on striking of fasteners by the striker, wherein the control circuit is further configured to:

obtain a number of strikes of fasteners by the striker and time intervals between each two consecutive strikes of the strikes of fasteners;

estimate a load of the bumper based on the time intervals and the number of strikes;

based on the estimated load of the bumper, impose the restriction on striking of fasteners such that the shorter the time intervals are, the fewer the number of strikes is performed before the restriction on striking of fasteners is imposed.

2. The driver according to claim 1, wherein the restriction of striking of fasteners restricts a number of times the striker strikes fasteners within a predetermined time period, and wherein when the number of times the striker strikes fasteners within the predetermined time period becomes less than a threshold value, the control circuit is configured to lift the restriction on striking of fasteners.

3. The driver according to claim 2, wherein the control circuit is further configured to control the time intervals to impose the restriction on striking fasteners by the striker.

4. The driver according to claim 1, further comprising a motor configured to move the striker to strike the fastener, wherein the control circuit is configured to operate the motor to move the striker, and wherein the control circuit is configured to restrict operation of the motor to move the striker in order to impose the restriction on striking fasteners by the striker.

5. The driver according to claim 1, wherein the control circuit is configured to impose a first restriction or a second restriction on striking of fasteners by the striker, the first restriction and the second restriction are different from each other.

6. The driver according to claim 1, further comprising a temperature sensor configured to detect a temperature in the driver, wherein the control circuit is further configured to estimate the load of the bumper based on a detected temperature, the time intervals, and the number of strikes, and wherein the control circuit is configured to impose the restriction on striking of fasteners when the load is equal to or greater than a threshold value.

7. The driver according to claim 1, wherein the control circuit is configured to lift the restriction on striking of fasteners when the detected temperature becomes lower than before.

8. The driver according to claim 1, wherein the temperature of the driver to be detected by the temperature sensor is a temperature of the control circuit.

9. The driver according to claim 1, wherein the control circuit is configured to impose the restriction on striking of fasteners when the load is equal to or greater than a threshold value.

10. The driver according to claim 1, wherein the control circuit is configured to lift the restriction on striking of fasteners when the striker does not strike fasteners for a predetermined time after imposing the restriction on striking of fasteners.

11. The driver according to claim 1, further comprising a panel including a display configured to display information indicating that the control circuit imposes the restriction on striking of fasteners.

12. The driver according to claim 11, further comprising a main switch operable to turn on the control circuit, the main switch being disposed on the panel.

13. The driver according to claim 4, further comprising a battery configured to supply power to the control circuit and the motor, wherein the motor is a brushless motor.

14. The driver according to claim 1, wherein the control circuit is further configured to obtain the time intervals and the number of strikes in response to the control circuit being actuated to operate the striker.

15. The driver according to claim 1, further comprising:

a wheel operable to rotate by the motor;

a permanent magnet disposed on the wheel; and a position sensor configured to detect a position of the permanent magnet, wherein the control circuit is configured to detect each of the strikes of fasteners based on a signal from the position sensor.

16. The driver according to claim 1, further comprising a vibration sensor configured to detect vibrations of the driver, wherein the control circuit is configured to detect that each of the strikes of fasteners based on a signal from the vibration sensor.

17. The driver according to claim 4, further comprising:

a biasing mechanism configured to actuate the striker to move in a first direction, and a power transmission mechanism configured to move the striker by the motor in a second direction opposite to the first direction and release the striker such that the striker is actuated by the biasing mechanism to move in the first direction.

18. The driver according to claim 17, further comprising a cylinder accommodating the striker, wherein the biasing mechanism comprises a pressure chamber to be filled with compressed gas, and wherein the pressure chamber is coupled to the cylinder such that the compressed gas is supplied to the cylinder.

19. A driver comprising:

a striker operable to strike a fastener;

a motor configured to move the striker;

a bumper configured to receive impact from the striker;

a control circuit configured to be actuated to operate the motor to move the striker;

a temperature sensor configured to detect a temperature in the driver other than the bumper and to input the signal of the temperature to the control circuit, wherein the control circuit is further configured to:

obtain a number of strikes of fasteners by the striker and time intervals between each two consecutive strikes of the strikes of fasteners;

estimate a load of the bumper based on the time intervals and the number of strikes, and based on an estimated load of the bumper, restrict operation of the motor even when the control circuit is actuated to operate the motor, and wherein the operation of the motor is restricted such that the greater a number of strikes within a predetermined time is, the fewer the number of strikes is performed before the operation of the motor is restricted.

20. A driver comprising:

a striker operable to strike a fastener;

a motor configured to move the striker;

a bumper configured to receive impact from the striker; and a control circuit configured to operate the motor to move the striker, wherein the control circuit is configured to restrict operation of the motor to move the striker, and wherein the control circuit is further configured to:

obtain a number of strikes of fasteners by the striker and time intervals between each two consecutive strikes of the strikes of fasteners to determine that a load on the bumper; and in response to determining that the load on the bumper is equal to or greater than a threshold value, restrict operation of the motor such that the greater the load is, the fewer the number of strikes is performed before the operation of the motor is restricted.

* * * * *